United States Patent
Harp

(10) Patent No.: US 10,676,116 B2
(45) Date of Patent: Jun. 9, 2020

(54) CROSSING WARNING EQUIPMENT MOUNT

(71) Applicant: SIEMENS MOBILITY, INC., New York, NY (US)

(72) Inventor: Brian Harp, New Albany, IN (US)

(73) Assignee: SIEMENS MOBILITY, INC., New York, NY (US)

( * ) Notice: Subject to any disclaimer, the term of this patent is extended or adjusted under 35 U.S.C. 154(b) by 298 days.

(21) Appl. No.: 15/688,924

(22) Filed: Aug. 29, 2017

(65) Prior Publication Data

US 2019/0061795 A1    Feb. 28, 2019

(51) Int. Cl.
| | |
|---|---|
| *B61L 29/24* | (2006.01) |
| *B61L 29/28* | (2006.01) |
| *H02G 3/14* | (2006.01) |
| *G10K 1/38* | (2006.01) |
| *H02G 3/04* | (2006.01) |
| *G10K 1/26* | (2006.01) |
| *H02G 3/08* | (2006.01) |

(52) U.S. Cl.
CPC ............ *B61L 29/246* (2013.01); *B61L 29/28* (2013.01); *G10K 1/26* (2013.01); *G10K 1/38* (2013.01); *H02G 3/0493* (2013.01); *H02G 3/14* (2013.01); *H02G 3/081* (2013.01)

(58) Field of Classification Search
CPC .......... B61L 29/00; B61L 29/08; B61L 29/24; B61L 29/26; B61L 29/28
See application file for complete search history.

(56) References Cited

U.S. PATENT DOCUMENTS

| | | | | |
|---|---|---|---|---|
| 3,394,498 | A * | 7/1968 | Reinitz | B61L 29/02 49/141 |
| 8,480,038 | B1 * | 7/2013 | Anderson | B61L 29/04 246/111 |
| 9,272,721 | B2 * | 3/2016 | Bohme | B61L 29/10 |
| 2010/0108823 | A1 * | 5/2010 | Barnes | B61L 29/24 246/111 |
| 2017/0072975 | A1 * | 3/2017 | Martin | B61L 29/28 |

* cited by examiner

*Primary Examiner* — Robert J McCarry, Jr.

(57) ABSTRACT

A cover plate for a junction box may include a plate portion configured to cover an opening of the junction box. The cover plate may include a mast portion configured to couple with equipment configured to be mounted on a mast. The cover plate may include an offset portion coupling the mast portion with a front side of the plate portion.

14 Claims, 6 Drawing Sheets

CROSSING WARNING EQUIPMENT MOUNT

BACKGROUND

Grade crossings are locations at which railroad tracks cross other thoroughfares, such as roads and sidewalks. To prevent traffic from the other thoroughfares from being struck by trains on the tracks, grade crossings are equipped with warning equipment. The warning equipment may include signs, flashing lights, audible alarms such as warning bells, retractable gates, and/or other equipment. Some of this warning equipment may be mounted on one or more masts. For example, warning bells are often mounted at the tops of such masts, which can be 16 feet or more above ground. This height can make bell maintenance or repair challenging and unsafe. Retrofitting masts to mount bells lower can also be difficult due to the existing bell wiring being disposed within the mast and protruding only at the top of the mast. For example, an installer may have to drill into the mast, potentially damaging wiring and/or other systems within the mast.

SUMMARY

Systems and methods described herein may provide mounts for warning equipment such as warning bells. These mounts may be configured so that they can be mounted relatively low on a mast (e.g., not at the top of the mast) and without drilling holes in the mast. For example, in some embodiments, a mount may be integrated into a cover plate for a box that holds electrical equipment (e.g., a junction box for flashing lights). The cover plate may be fixed to the box at the time of box manufacture and/or assembly, or the cover plate may be retrofitted to the box by swapping out an old cover plate for a cover plate described herein.

DETAILED DESCRIPTION OF SEVERAL EMBODIMENTS

Figure 1:
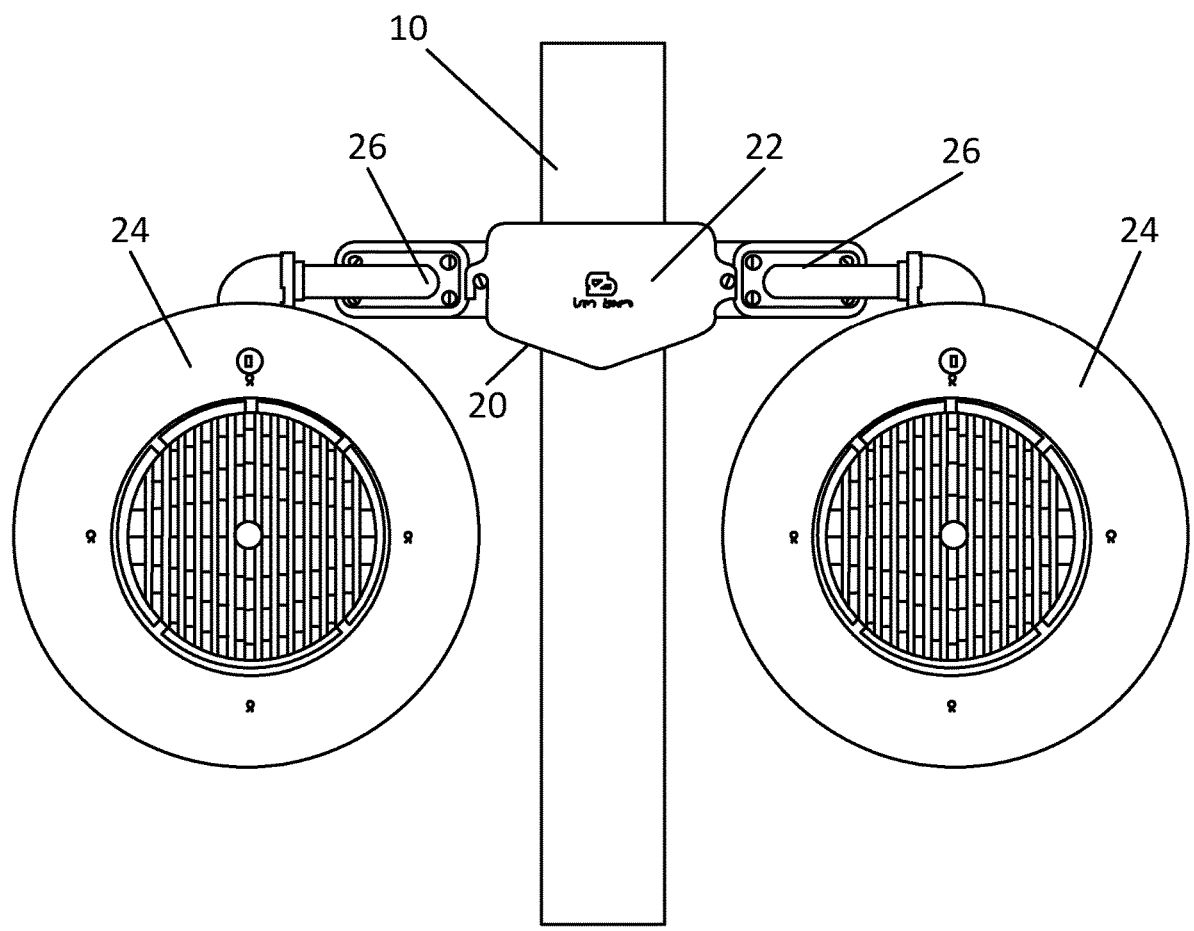
FIG. 1 is a front elevation view of a mast and flashing light assembly.

Systems and methods described herein may provide mounts for installing and/or retrofitting warning bells onto cover plates for junction boxes. For example, grade crossings may include flashing lights mounted to a mast. The flashing lights may be controlled by electronics in a junction box. FIG. 1 is a front elevation view of a mast 10 and flashing light assembly. The flashing light assembly includes junction box 20, which may be mounted to mast 10. For example, junction box 20 may be mounted to mast 10 by hardware such as screws, bolts, brackets, u-bolts, etc.; welded to mast 10; or otherwise attached to mast 10. Flashing lights 24 may be coupled to junction box 20 by arms 26. Wiring may run from junction box 20 through arms 26 to flashing lights 24.

Junction box 20 may include a removable cover plate 22. Cover plate 22 may be removed to reveal wiring inside junction box 20. For example, the wiring may run from junction box 20 to flashing lights 24 as noted above. Wiring may also run inside mast 10. Wiring inside mast 10 may include the wiring that supplies power and/or control signals to flashing lights 24 as well as other wiring. For example, the other wiring may include wiring that supplies power and/or control signals to one or more warning bells mounted on mast 10. Cover plate 22 may be removably coupled to a body of junction box 20 by hardware such as screws or bolts, or cover plate 22 may be removably coupled to the body of junction box 20 by one or more hinges. These coupling options are presented as examples only, and cover plate 22 may be removably coupled to the body of junction box 20 in any fashion.

Figure 2:
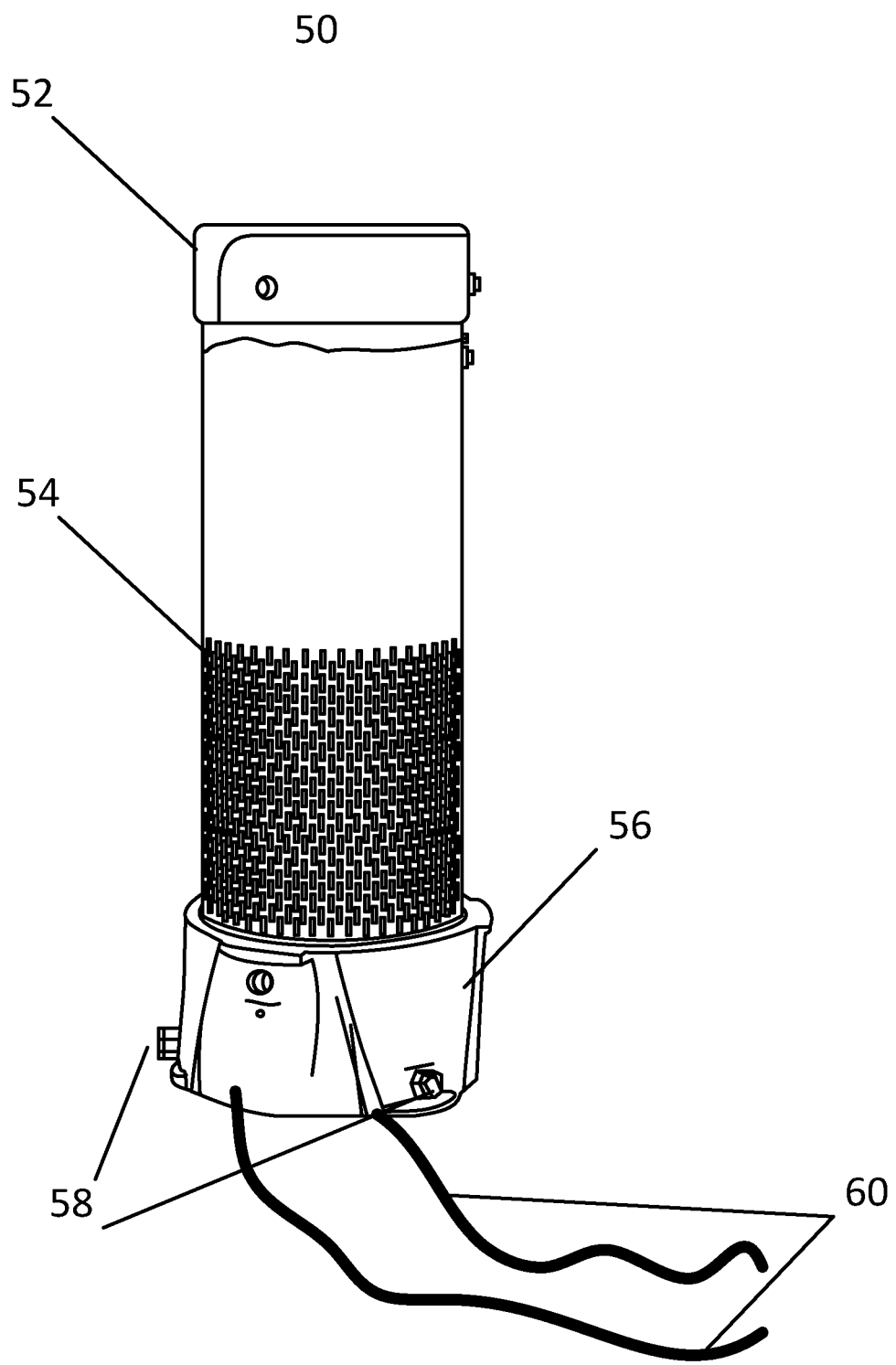
FIG. 2 is a perspective view of a bell.

FIG. 2 is a perspective view of a bell 50. Bell 50 may include enclosure 52 enclosing an electromechanical or electric bell. For example, the bell may be an electric bell including a downward-facing horn speaker configured to output sound at 82 dBA or 94 dBA (measured at 3 meters from the bell) at 160 pulses/minute or 200 pulses/minute. The bell may be supplied by a 9-15 Vdc (nominal 12 Vdc) signal. The signal may be supplied through wires 60, which may be integrated into bell 50 or may be attached to bell 50 at leads (e.g., at the bottom of bell 50) (not shown). These bell characteristics are presented as examples only, and other bells may be housed within enclosure 52. Enclosure 52 may include vents 54 configured to encourage sound emission from the bell inside enclosure 52.

Bell 50 may include mounting portion 56. Mounting portion 56 may be configured to mount to the top of a pole or other protruding element. For example, mounting portion 56 may be configured to mount to the top of mast 10. To couple bell 50 to mast 10 or other element, one or more clamp bolts 58 may be disposed in mounting portion 56. For example, some embodiments may include three clamp bolts 58. Other embodiments may include other mounting hardware. Mounting portion 56 may be sized and configured to fit over mast 10 or other element having a diameter of four inches or five inches in some embodiments, although other configurations for other mast 10 sizes may be possible.

Figure 3:
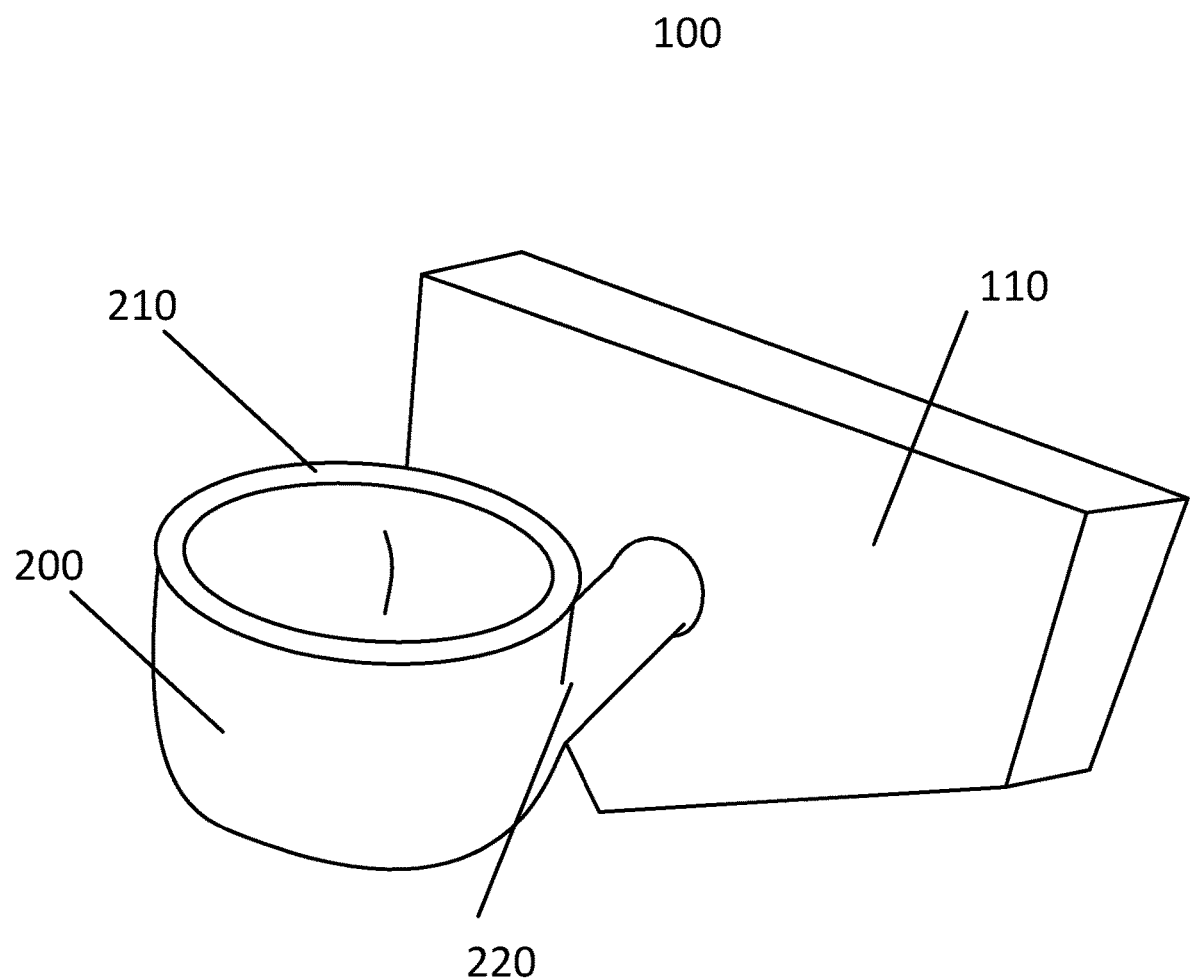
FIG. 3 is a perspective view of a cover plate including a bell mount according to an embodiment of the invention.
Figure 4:
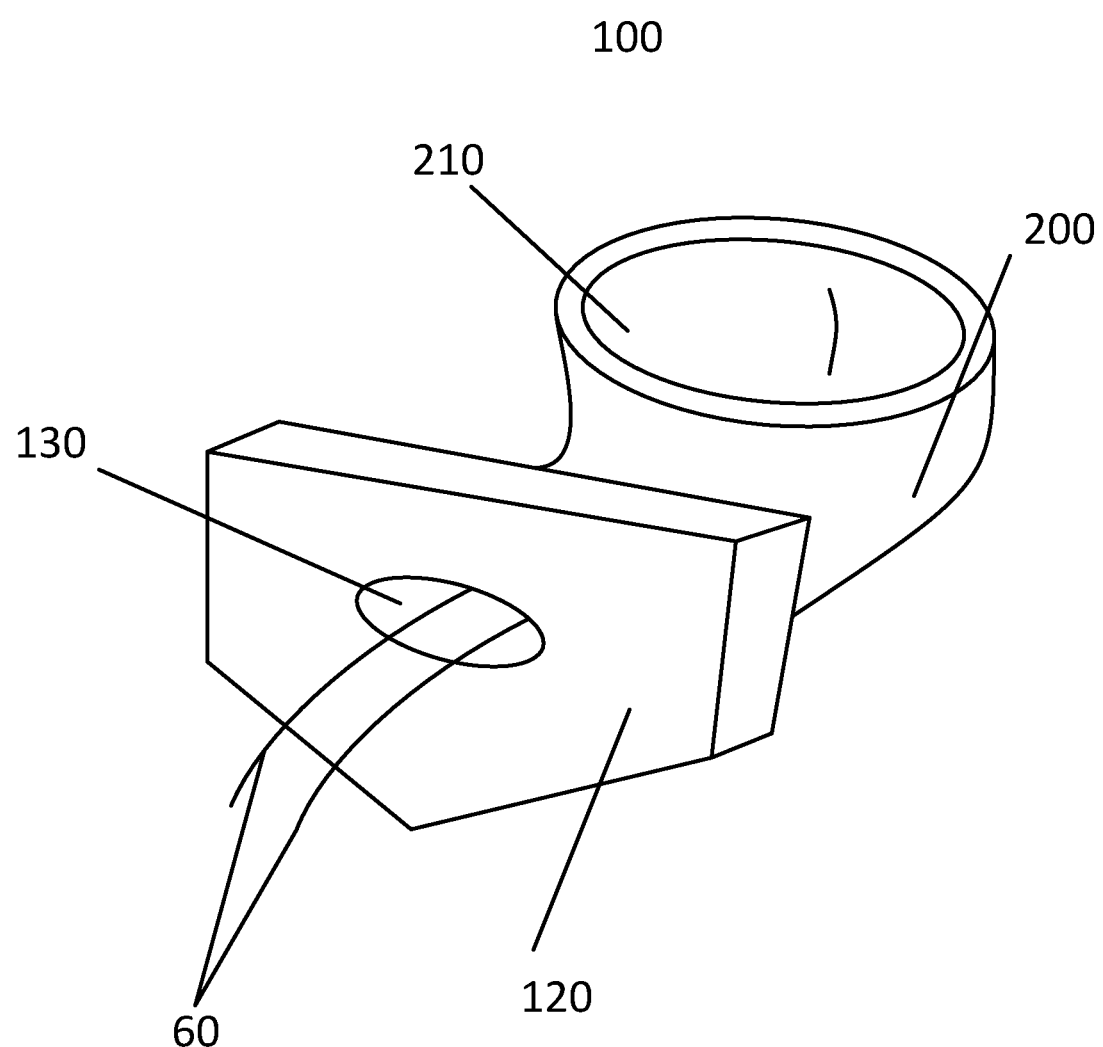
FIG. 4 is a perspective view of a cover plate including a bell mount according to an embodiment of the invention.

FIGS. 3 and 4 are perspective views of a cover plate 100 including a bell mount 200 according to an embodiment of the invention. FIG. 3 shows front side 110 of cover plate 100, and FIG. 4 shows back side 120 of cover plate 100. Cover plate 100 may be made of cast aluminum in some embodiments, although other materials may be possible. Cover plate 100 may be configured to mount to junction box 20 of FIG. 1. For example, cover plate 100 may be configured to be removably coupled to junction box 20 by hardware such as screws or bolts (not shown), or cover plate 100 may be removably coupled to the body of junction box 20 by one or more hinges (not shown), depending on the configuration of junction box 20. In some embodiments, cover plate 100 may be coupled to junction box 20 at the time of junction box 20 assembly. In some embodiments, cover plate 100 may be retrofitted to junction box 20 in the field (e.g., after junction box 20 has been mounted to mast 10).

Cover plate 100 may include bell mount 200. Bell mount 200 may be formed integrally with cover plate 100. For example, when cover plate 100 is a cast aluminum element, bell mount 200 may be formed of the same piece of cast aluminum. In other embodiments, bell mount 200 may be coupled to cover plate 100 (e.g., by welding, hardware, or in some other fashion).

Bell mount 200 may be configured to mount bell 50 or other equipment. Accordingly, bell mount 200 may include mast portion 210. Mast portion 210 may be a hollow cylindrical section extending upwards (e.g., oriented parallel to mast 10 when cover plate 100 is installed on junction box 20 coupled to mast 10). Mast portion 210 may have a diameter (e.g., oriented perpendicular to mast 10 when cover plate 100 is installed on junction box 20 coupled to mast 10) sized to accept mounting portion 56 of bell 50. For example, mast portion 210 may have a diameter of four inches or five inches in some embodiments, although other configurations for other mast portion 210 sizes may be possible.

Bell mount 200 may be connected to front side 110 cover plate 100 by offset portion 220. Offset portion 220 may be a hollow section spacing mast portion 210 away from cover plate 100 to provide clearance for bell 50 from cover plate 100 when bell 50 is coupled to mast portion 210.

The hollow interior of offset portion 220 may be continuous with the hollow interior of mast portion 210. Hole 130 on back side 120 of cover plate 100 may provide access to the hollow section of offset portion 220 and mast portion 210. Accordingly, wires 60 supplying the power signal to bell 50 (e.g., as described above) may be fed from the interior of junction box 20, through the hollow section of offset portion 220 and mast portion 210, to bell 50. For example, wires 60 may run through the interior of mast 10 and may be accessible inside junction box 20. When junction box 20 is installed, or when cover plate 100 is retrofitted to previously-installed junction box 20, an installer may be able to access wires 60 and connect them to bell 50, shortening wires 60 if desired (e.g., if wires 60 are long enough to power a bell mounted at the top of mast 10).

Figure 5:
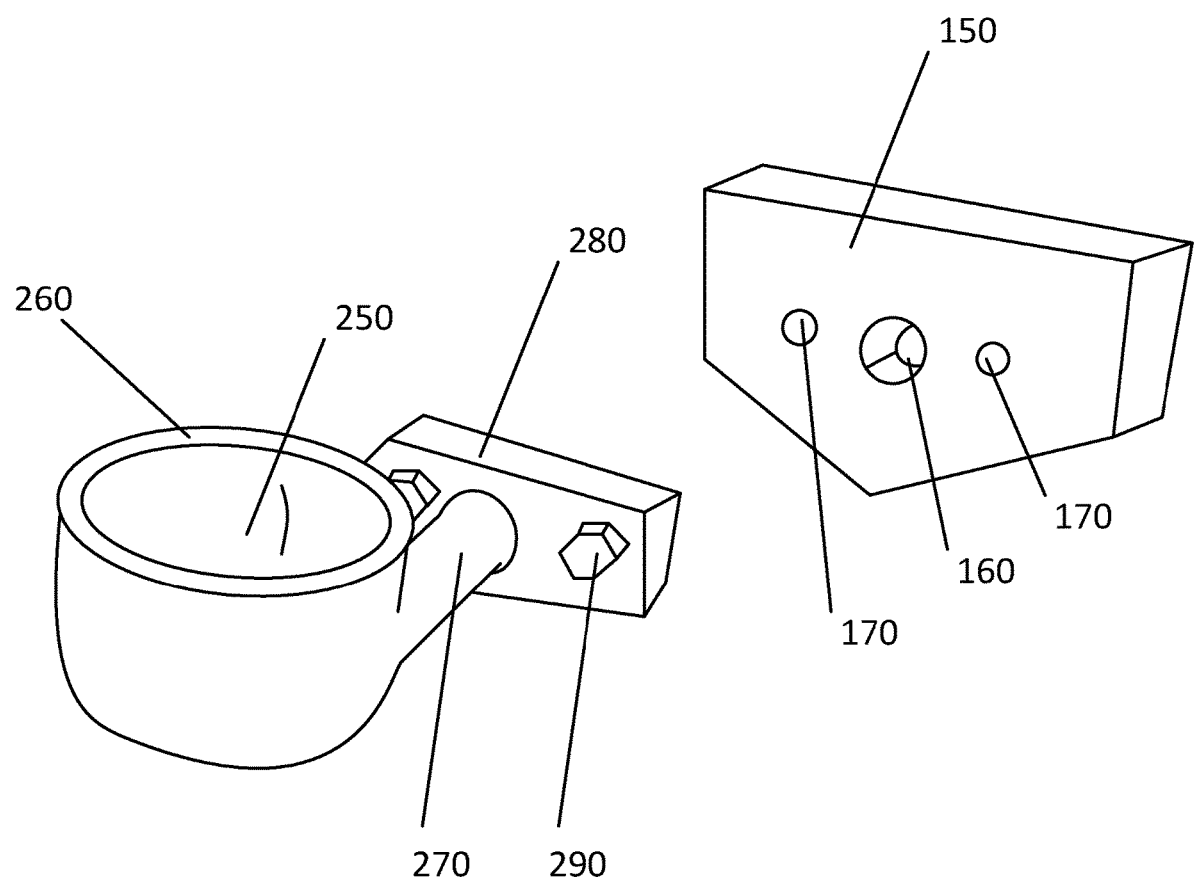
FIG. 5 is a perspective view of a cover plate and a bell mount according to an embodiment of the invention.

FIG. 5 is a perspective view of a separate cover plate 150 bell mount 250 according to an embodiment of the invention. In this embodiment, cover plate 150 and bell mount 250 may function similarly to cover plate 100 and bell mount 200 of FIGS. 4 and 5, respectively. For example, cover plate 150 may be configured to be removably coupled to junction box 20 by hardware such as screws or bolts (not shown), or cover plate 100 may be removably coupled to the body of junction box 20 by one or more hinges (not shown), depending on the configuration of junction box 20. Bell mount 250 may be configured to mount bell 50 or other equipment at mast portion 260, with space for wires 60 to run through mast portion 260 and spacer portion 270. Cover plate 150 may include hole 160 for wires 60 to run from junction box 20 into spacer portion 270 and mast portion 260 to bell 50.

However, unlike cover plate 100 and bell mount 200 of FIGS. 4 and 5, cover plate 150 and bell mount 250 may be detachably coupled to one another. For example, bell mount 250 may include bracket 280 and hardware 290 (e.g., screws, bolts, or other hardware). Cover plate 150 may include mounting points 170 configured to couple with hardware 290.

Figure 6:
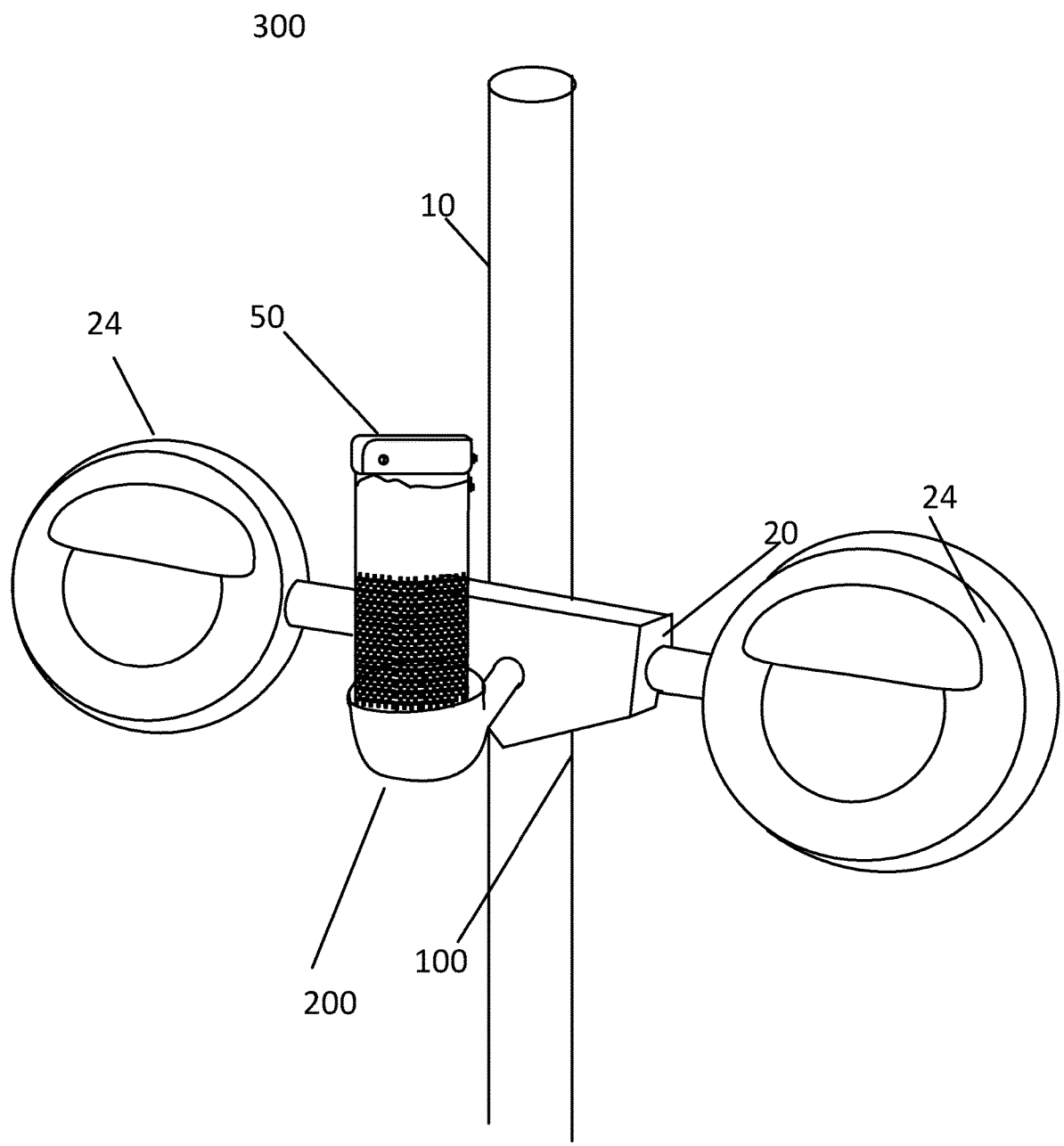
FIG. 6 is a perspective view of a mast, bell, and flashing light assembly according to an embodiment of the invention.

FIG. 6 is a perspective view of a mast 10, bell 50, and flashing light 24 assembly 300 according to an embodiment of the invention. Assembly 300 is an embodiment wherein junction box 20 has been configured or retrofitted with cover plate 100 and bell mount 200. Bell 50 is shown mounted to bell mount 200. Due to this configuration, bell 50 may be mounted significantly lower than the top of mast 10, providing easier access to bell 50 for installation, maintenance, and/or replacement. Additionally, because bell 50 may be mounted to bell mount 200 on removable cover plate 100, a user attempting to access wiring (e.g., wires 60) may do so by removing cover plate 100, rather than cutting into mast 10. Furthermore, in embodiments wherein junction box 20 has been retrofitted with cover plate 100 and bell mount 200, a user may have installed cover plate 100 and bell mount 200 without drilling or cutting into mast 10 to access wiring and/or create mount points for mounting hardware.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, mast 10 may include other junction boxes for other electrical equipment besides junction box 20 for flashing lights 24. Cover plate 100, 150 and bell mount 200, 250 may be configured to be installed and/or retrofitted onto other junction boxes.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A cover plate for a junction box, the cover plate comprising:
   a plate portion configured to cover an opening of the junction box;
   a mast portion configured as a hollow cylindrical section and to couple with equipment configured to be mounted on a mast; and
   an offset portion coupling the mast portion with a front side of the plate portion, the offset portion comprising a hollow interior,
   wherein the hollow cylindrical section of the mast portion is continuous with the hollow interior of the offset portion and forming a hollow inner portion with a first opening at a top of the mast portion and a second opening at a back side of the plate portion, and
   wherein the hollow inner portion provides space for wires to run from the junction box through the plate portion, the offset portion and the mast portion.

2. The cover plate of claim 1, wherein the offset portion is detachably coupled to the plate portion.

3. The cover plate of claim 1, wherein the plate portion, the mast portion, and the offset portion are integrally formed.

4. The cover plate of claim 1, wherein the equipment comprises a bell.

5. The cover plate of claim 1, wherein the junction box is a junction box for a flashing light system.

6. The cover plate of claim 1, wherein at least one of the plate portion, the mast portion, and the offset portion comprises aluminum.

7. The cover plate of claim 1, wherein the plate portion is detachably coupled to the junction box.

8. A method of configuring a junction box, the method comprising:
   coupling a cover plate to an opening of the junction box, the cover plate comprising:

a plate portion configured to cover the opening of the junction box, a mast portion configured as a hollow cylindrical section and to couple with equipment configured to be mounted on a mast, and an offset portion coupling the mast portion with a front side of the plate portion, the offset portion comprising a hollow interior, wherein the hollow cylindrical section of the mast portion is continuous with the hollow interior of the offset portion and forming a hollow inner portion with a first opening at a top of the mast portion and a second opening at a back side of the plate portion, and wherein the hollow inner portion provides space for wires to run from the junction box through the plate portion, the offset portion and the mast portion.

9. The method of claim 8, further comprising installing the equipment on the mast portion.

10. The method of claim 9, wherein the installing comprises attaching at least one wire disposed within the junction box to the equipment.

11. The method of claim 8, further comprising coupling the junction box to a mast.

12. The method of claim 8, wherein the coupling of the cover plate to the opening of the junction box is performed after the junction box has been coupled to a mast.

13. The method of claim 8, wherein the equipment comprises a bell.

14. The method of claim 8, wherein the junction box is a junction box for a flashing light system.

* * * * *